Patented Aug. 8, 1939

2,168,550

UNITED STATES PATENT OFFICE 2,168,550

SOLUTION FOR PROPAGATION OF PLANTS

Percy W. Zimmerman and Albert E. Hitchcock, Yonkers, N. Y., assignors to Boyce Thompson Institute for Plant Research, Inc., Yonkers, N. Y., a corporation of New York No Drawing. Application November 20, 1937, Serial No. 175,590

10 Claims. (Cl. 71—2)

This invention relates to the propagation of plants, and has for its principal object the provision of an improved composition of matter suitable for use in the propagation of plants. The invention also aims to provide an improved method for preparing aqueous solutions, suitable for use in the treatment of plant cuttings for propagation purposes, of substances capable of inducing root-growth on plant cuttings and the like.

It has been found recently that it is possible to induce root-growth on plant stems, cuttings, slips and other plant parts by suitable treatment of the plant part with various organic substances. Among the substances that have been found particularly effective for inducing root-growth (herein termed root-growth substances) are indoleacetic acid, indolepropionic acid, indolebutyric acid, indolevaleric acid, naphthaleneacetic acid, phenylacetic acid, and esters and salts of these acids. These substances are most effectively employed in the form of dilute aqueous solutions for the treatment of cuttings and other plant parts for propagation purposes. Although only very dilute aqueous solutions, containing about 80 parts per million or even less of the root-growth substances, are necessary to secure optimum plant responses, the root-growth substances are so sparingly soluble in water that the preparation of even these dilute solutions is difficult. For example, when preparing aqueous solutions from a growth substance in crystalline form, it is necessary to agitate a few milligrams of the crystalline substance in a considerable volume of water for periods ranging up to several days before a solution containing the substance in adequate concentration is obtained.

The present invention provides a composition of matter including a root-growth substance that is easy to prepare and from which aqueous solutions suitable for use in the propagation of plants are easily prepared. The composition of the invention comprises an alcoholic solvent containing in solution at least one of the root-growth substances mentioned above, the root-growth substance being present in the composition in a concentration preferably not substantially less than about 8 milligrams per cubic centimeter of alcoholic solvent on the basis of the solvent in its pure form.

The composition of the invention contains the root-growth substance in a considerably higher concentration than is desirable for optimum results in plant propagation. In using the composition, however, it is necessary only to dilute it with a sufficient volume of water and to stir the resulting dilution for a few moments. The relatively high concentration of growth substance in the composition of the invention, together with the ease with which suitable aqueous solutions are prepared from it for use in plant propagation, renders the composition of the invention particularly suitable as a means for distributing root-growth substances commercially to the trade.

The solvent employed in the composition of the invention preferably is one possessing antiseptic qualities; that is, it should be a compound in which bacterial and fungus growth and activity is inhibited. This characteristic of the solvent is desirable because the root-growth substances employed in the composition are susceptible to decomposition or conversion to inactive forms by bacterial or fungus activity. The stability of the composition and its practicability as a means for commercial distribution of root-growth substances is considerably improved, therefore, if the solvent possesses antiseptic properties. Alcoholic solvents in general meet this qualification.

Among the alcoholic solvents that are particularly satisfactory for use in making up the composition of the invention are the lower aliphatic alcohols, such as methyl alcohol, ethyl alcohol and isopropyl alcohol. Polyhydric alcohols such as ethylene glycol also may be employed. Ethyl alcohol, because of its comparative cheapness and desirable physical properties, in general is preferred as the solvent.

It has been found that ethyl alcohol and other suitable alcoholic solvents are toxic to plant cuttings and the like if present in substantial concentrations in the aqueous solutions prepared from the composition of the invention. On the other hand, experiments indicate that if the alcohol is present in proper low concentrations in the aqueous solutions, the ability of the root-growth substance to induce the growth of roots is enhanced thereby. In preparing the composition, therefore, the concentration of root-growth substance incorporated in the alcoholic solvent is of considerable importance.

In general, the presence of alcohol in a concentration exceeding about 1% by volume of the aqueous solution prepared from the composition is toxic to plant cuttings, whereas less than about 1% of alcohol is not particularly harmful and may even be beneficial. Sufficient root-growth substance therefore must be present in the composition to permit dilution by a hundredfold without reducing the concentration of the root-growth substance in the diluted solution to a value less than required for effective treatment of cuttings and the like.

In the treatment of cuttings that are difficult or moderately difficult to root, the dilute aqueous solution should contain about 80 parts by weight of the root-growth substance per million parts of solution. (In the treatment of cuttings from some easily rooted plants, however, aqueous solutions containing as low as 20 parts per million of the root-growth substance will give satisfactory results.) Hence the concentration of root-growth substance in the composition ordinarily should be equal at least to about 8 milligrams per cubic centimeter of ethyl alcohol or other solvent on the basis of the solvent in its pure state (although in the case of compositions intended for use only in the treatment of easily rooted cuttings, concentrations as low as 2 milligrams per cubic centimeter may be employed).

In contrast with the fact that the alcoholic solvent in relatively high concentrations is toxic to plant cuttings, experiments indicate that proper low concentrations of alcohol in the aqueous solution enhance the ability of the root-growth substances to induce the growth of roots on cuttings. For example, in a series of tests with tomato leaf cuttings (a particularly easily-rooted type of cutting), it was found that the presence of a small quanity of ethyl alcohol increased the ability of indolebutyric acid to induce root-growth. In these experiments, tomato leaf cuttings were treated with aqueous indolebutyric acid solutions containing different amounts of ethyl alcohol. The number of roots formed on each cutting eight days after treatment indicated that solutions containing a small quantity of alcohol were more effective in inducing root-growth than solutions containing either a substantial quantity of alcohol or none at all.

It is not to be inferred from these experiments that the alcohol itself, even in low concentrations, possesses any powers to induce root-growth. A more likely explanation of the action of the alcohol is that its presence facilitates penetration of the indolebutyric acid other root-growth substance into the tissues of the plant cuttings. At low concentrations of alcohol a point is reached at which this beneficial action of the alcohol considerably more than offsets its inherent toxicity. The presence of alcohol, therefore, is not altogether objectionable in the aqueous solutions prepared from the composition of the invention and in proper circumstances is more beneficial than harmful. For most purposes it is preferred to prepare the composition with an alcohol concentration sufficiently high so that upon suitable dilution the alcohol concentration will amount at least to about 0.1%. Although this value represents the preferred minimum concentration of alcohol in the diluted solution, lesser (even considerably lesser) concentrations may be desirable in the treatment of particularly sensitive plants.

It is desirable to employ the alcoholic solvent not in its pure state, but in admixture with water. When so employed, less dilution of the composition is necessary to reduce the concentration of the solvent in the aqueous solution to a point at which it is substantially non-toxic to cuttings from most plants and begins even to exert a beneficial effect. Accurate measurement of the amount of composition necessary for making up small quantities (a pint or less) of solution for plant treatment purposes is thus facilitated. The alcoholic solvent, however, should constitute at least 50% by volume of the composition. With this concentration of a solvent such as ethyl alcohol, the composition ordinarily should contain at least 4 milligrams per cubic centimeter of the root-growth substance (although in some cases as little as 1 milligram of the growth substance per cubic centimeter may be employed).

The upper limit of concentration of root-growth substance in the composition is governed by the solubility of the substance in the solvent, by the maximum amount of substance that will remain active in the composition over considerable periods of time, and by the ease with which the composition is measured for the purpose of making up relatively small volumes of solution. Upwards of 50 milligrams per cubic centimeter of the growth substance is soluble in 95% ethyl alcohol, but this concentration is too high for the provision of a stable, easily measured composition. In the case of 50% ethyl alcohol, the solubility of the root-growth substance is considerably less, being for indolebutyric acid between 20 and 24 milligrams per cubic centimeter. Even this concentration of root-growth substance is somewhat high for the provision of a stable composition that may conveniently be measured in the preparation of aqueous solutions.

The alcohol concentration in the solvent should not be decreased to substantially less than 50%, however, because as the alcohol becomes more dilute, the solubility of the root-growth substance becomes relatively small. For example, the solubility of indolebutyric acid in 30% aqueous ethyl alcohol is only about 4 milligrams per cubic centimeter. Moreover, the composition loses in stability if the alcohol concentration falls very much below about 50%, with the result that the shelf life of the composition is decreased.

A concentration of about 16 milligrams of root-growth substance per cubic centimeter of composition, with the solvent diluted to about 50% by volume of the composition (corresponding about to 32 milligrams per cubic centimeter on the basis of the pure solvent) is the maximum that it is advisable to employ. Owing, however, to the desirability of maintaining the concentrations of the root-growth substance and solvent in the composition at the lowest values consistent with stability and ease of measurement of the composition, it is preferred to employ only about 4 milligrams of the substance in an alcoholic solvent diluted 50% by volume with water.

In making up the composition of the invention, the root-growth substance indolebutyric acid, for example) is dissolved in the solvent (for example, ethyl alcohol) either before or after dilution of the solvent to about 50% by volume with water. Ordinarily it is more convenient to dissolve the indolebutyric acid in the ethyl alcohol before dilution because of its greater solubility in the concentrated alcohol. As indicated above, the amount of indolebutyric acid dissolved is sufficient to give a solution containing about 8 milligrams per cubic centimeter on the basis of pure ethyl alcohol. After dilution of the alcohol to about 50% by volume, the composition contains about 4 milligrams per cubic centimeter of indolebutyric acid. Indolebutyric acid (and other root-growth substances) dissolve readily in the alcohol in the concentrations employed in accordance with the invention.

Compositions containing naphthaleneacetic acid are prepared in substantially the same manner and in the same proportions as described above in connection with indolebutyric acid. In general, substantially the same critical features (the nature of the solvent, the concentration limits of the substance in the solvent, and the concentration of the solvent in the composition) that apply to indolebutyric acid and naphthaleneacetic acid are applicable also to other root-growth substances.

The composition of the invention is easily prepared and provides a convenient means for distributing root-growth substances commercially to small as well as large users. Even in cases where the composition of the invention is not employed for purposes of commercial distribution of the root-growth substances, the invention provides a convenient means for preparing aqueous solutions of the root-growth substance for plant treatment purposes. For, in accordance with the invention, preliminary dissolution of the root-growth substance in a suitable alcoholic solvent and subsequent dilution of the solution thus prepared with an adequate volume of water greatly reduces the time required and the difficulty involved in dissolving even minute amounts of growth substances directly in water.

We claim:

1. A concentrated composition suitable for use in the propagation of plants comprising an alcoholic solvent containing in solution a root-growth substance of the group consisting of indoleacetic acid, indoleproprionic acid, indolebutyric acid, indolevaleric acid, naphthaleneacetic acid, phenylacetic acid, and esters and salts thereof, said root-growth substance being present in the composition in a concentration not substantially less than about 2 milligrams per cubic centimeter on the basis of the alcoholic solvent in its pure form, and said composition being prepared and packaged for use upon dilution as a root-growth stimulant in the propagation of plants.

2. A concentrated composition suitable for use in the propagation of plants comprising an alcoholic solvent containing in solution of root-growth substance of the group consisting of indoleacetic acid, indolepropionic acid, indolebutyric acid, indolevaleric acid, naphthaleneacetic acid, phenylacetic acid, and esters and salts thereof, said root growth substance being present in the composition in a concentration between about 2 milligrams and 32 milligrams per cubic centimeter on the basis of the alcoholic solvent in its pure form, said composition being prepared and packaged for use upon dilution as a root-growth stimulant in the propagation of plants.

3. A concentrated composition suitable for use in the propagation of plants comprising water and a lower aliphatic alcohol, and containing in solution a root-growth substance of the group consisting of indoleacetic acid, indoleproprionic acid, indolebutyric acid, indolevaleric acid, naphthaleneacetic acid, phenylacetic acid, and esters and salts thereof, said water and alcohol each constituting about 50% by volume of the composition and said root-growth substance being present in the composition in a concentration between about 1 milligram and 16 milligrams per cubic centimeter, said composition being prepared and packaged for use upon dilution as a root-growth stimulant in the propagation of plants.

4. A concentrated composition suitable for use in the propagation of plants comprising about 50% water and about 50% of a lower aliphatic alcohol by volume and containing in solution about 4 milligrams per cubic centimeter of a root-growth substance of the class consisting of indoleacetic acid, indolepropionic acid, indolebutyric acid, naphthaleneacetic acid, and phenylacetic acid, said composition being prepared and packaged for use upon dilution as a root-growth stimulant in the propagation of plants.

5. A concentrated composition suitable for use in the propagation of plants comprising ethyl alcohol in an amount equal at least to about 50% by volume of the composition, indolebutyric acid in an amount corresponding to about 2 milligrams to 32 milligrams per cubic centimeter of pure ethyl alcohol, and the balance chiefly water, said composition being prepared and packaged for use upon dilution as a root-growth stimulant in the propagation of plants.

6. A concentrated composition suitable for use in the propagation of plants comprising ethyl alcohol in an amount equal at least to about 50% by volume of the composition, naphthaleneacetic acid in an amount corresponding to about 2 milligrams to 32 milligrams per cubic centimeter of pure ethyl alcohol, and the balance chiefly water, said composition being prepared and packaged for use upon dilution as a root-growth stimulant in the propagation of plants.

7. A concentrated composition suitable for use in the propagation of plants comprising about 50% by volume of ethyl alcohol, about 8 milligrams of indolebutyric acid per cubic centimeter of pure ethyl alcohol, and the balance chiefly water, said composition being prepared and packaged for use upon dilution as a root-growth stimulant in the propagation of plants.

8. A concentrated composition suitable for use in the propagation of plants comprising about 50% by volume of ethyl alcohol, about 8 milligrams of naphthaleneacetic acid per cubic centimeter of pure ethyl alcohol, and the balance chiefly water, said composition being prepared and packaged for use upon dilution as a root-growth stimulant in the propagation of plants.

9. The method of expediting the preparation of an aqueous solution of a root-growth substance of the group consisting of indoleacetic acid, indolepropionic acid, indolebutyric acid, indolevaleric acid, naphthaleneacetic acid, phenylacetic acid, and esters and salts thereof, suitable for use in the treatment of plant cuttings for purposes of propagation, which comprises dissolving the root-growth substance in an alcoholic solvent and diluting the resulting alcoholic solution with water to a point at which the concentration of alcohol in the aqueous solution thus obtained is less than about 1%.

10. The method of expediting the preparation of an aqueous solution of a root-growth substance of the group consisting of indoleacetic acid, indoleproprionic acid, indolebutyric acid, indolevaleric acid, naphthaleneacetic acid, phenylacetic acid, and esters and salts thereof, suitable for use in the treatment of plant cuttings for purposes of propagation, which comprises dissolving the root-growth substance in an alcoholic solvent in a concentration sufficiently high to permit dilution of the resulting solution with water to 100 times its original volume without reducing the concentration of the root-growth substance to less than about 80 parts per million, and diluting the resulting solution with water to at least 100 times its original volume.

PERCY W. ZIMMERMAN.
ALBERT E. HITCHCOCK.